(12) United States Patent
Choi (10) Patent No.: US 8,911,012 B2
(45) Date of Patent: Dec. 16, 2014

(54) APPARATUS FOR ADJUSTING SADDLE RETAINING ANGLE OF BICYCLE

(76) Inventor: Jong Tae Choi, Daegu (KR)

( * ) Notice: Subject to any disclaimer, the term of this patent is extended or adjusted under 35 U.S.C. 154(b) by 0 days.

(21) Appl. No.: 13/258,707

(22) PCT Filed: Jun. 9, 2011

(86) PCT No.: PCT/KR2011/004228
§ 371 (c)(1),
(2), (4) Date: Jun. 8, 2012

(87) PCT Pub. No.: WO2012/050288
PCT Pub. Date: Apr. 19, 2012

(65) Prior Publication Data
US 2013/0207424 A1 Aug. 15, 2013

(30) Foreign Application Priority Data

Oct. 11, 2010 (KR) .................. 10-2010-0098912
Nov. 9, 2010 (KR) .................. 10-2010-0110707

(51) Int. Cl.
*B62J 1/00* (2006.01)
*B62J 1/04* (2006.01)
*B62J 1/08* (2006.01)

(52) U.S. Cl.
CPC .... *B62J 1/00* (2013.01); *B62J 1/04* (2013.01); *B62J 1/08* (2013.01); *Y10S 403/06* (2013.01)
USPC ................. 297/215.15; 403/328; 403/DIG. 6

(58) Field of Classification Search
CPC ........................................................ B62J 1/10
USPC .................................................... 297/215.15
See application file for complete search history.

(56) References Cited

U.S. PATENT DOCUMENTS

| | | | | |
|---|---|---|---|---|
| 471,744 A | * | 3/1892 | Hanson | ........................ 297/205 |
| 4,605,227 A | * | 8/1986 | Hurd et al. | ...................... 473/63 |
| 4,836,604 A | | 6/1989 | Romano | |
| 4,864,924 A | * | 9/1989 | Storace | ......................... 101/110 |
| 5,190,346 A | | 3/1993 | Ringle | |
| 5,383,706 A | | 1/1995 | Chen | |
| 5,441,327 A | | 8/1995 | Sanderson | |
| 5,466,042 A | | 11/1995 | Herman | |
| 5,513,895 A | | 5/1996 | Olson et al. | |
| 5,515,754 A | * | 5/1996 | Elkins | ......................... 81/177.9 |
| 5,571,273 A | | 11/1996 | Saarinen | |
| 5,915,784 A | | 6/1999 | Clark | |
| 6,113,305 A | * | 9/2000 | Takaguchi | .................... 403/321 |

(Continued)

FOREIGN PATENT DOCUMENTS

| | | | |
|---|---|---|---|
| DE | 102005038565 | * | 2/2007 |
| DE | 10206230 B4 | * | 5/2007 |

(Continued)

*Primary Examiner* — David E Allred
(74) *Attorney, Agent, or Firm* — Brooks Kushman P.C.

(57) ABSTRACT

The present invention relates to an apparatus for adjusting a saddle retaining angle of a bicycle, and in particular to an apparatus for adjusting a saddle retaining angle of a bicycle by which a user can ride a bicycle in a safe posture irrespective of an inclination of a bicycle when a bicycle goes up or down an inclined road in such a manner that a retaining angle of a bicycle saddle fixed to a bicycle body can be easily changed by a rider depending on an inclination of a bicycle so that a user can ride in a safe posture.

11 Claims, 11 Drawing Sheets

(56) References Cited

U.S. PATENT DOCUMENTS

| | | |
|---|---|---|
| 6,174,027 B1 | 1/2001 | Lemmens |
| 6,827,397 B1 | 12/2004 | Driver |
| 6,993,998 B1 * | 2/2006 | Kao et al. .......................... 81/60 |
| 7,044,542 B2 * | 5/2006 | Muscat .................... 297/215.15 |
| 7,322,645 B2 | 1/2008 | Roizen |
| 7,377,567 B2 * | 5/2008 | Walsh ........................ 294/82.28 |
| 8,197,002 B2 * | 6/2012 | Hsu .......................... 297/215.15 |
| 8,544,947 B2 * | 10/2013 | Sloan ....................... 297/215.13 |
| 2004/0239159 A1 * | 12/2004 | Muscat .................... 297/215.15 |

FOREIGN PATENT DOCUMENTS

| | | | | |
|---|---|---|---|---|
| EP | 1440874 A1 * | 7/2004 | ................ | B62J 1/10 |
| GB | 623159 A * | 5/1949 | | |
| GB | 2322344 A * | 8/1998 | ............ | B62K 21/16 |
| KR | 100981994 B1 | 9/2010 | | |
| WO | WO 9507833 A1 * | 3/1995 | | |
| WO | WO 0000379 A1 * | 1/2000 | | |
| WO | WO 2007063099 A1 * | 6/2007 | | |

* cited by examiner

Fig. 12

APPARATUS FOR ADJUSTING SADDLE RETAINING ANGLE OF BICYCLE

CROSS-REFERENCE TO RELATED APPLICATION

This application is the U.S. national phase of PCT Appln. No. PCT/KR2011/004228, filed Jun. 9, 2011, which claims priority to Korean application KR 10-2010-0098912 filed Oct. 11, 2010 and which claims priority to Korean application KR 10-2010-0110707, filed Nov. 9, 2010, the disclosures of which are incorporated in their entirety by reference herein.

TECHNICAL FIELD

The present invention relates to an apparatus for adjusting a saddle retaining angle of a bicycle, and in particular to an apparatus for adjusting a saddle retaining angle of a bicycle by which a user can ride a bicycle in a safe posture irrespective of an inclination of a bicycle when a bicycle goes up or down an inclined road in such a manner that a retaining angle of a bicycle saddle fixed to a bicycle body can be easily changed by a rider depending on an inclination of a bicycle so that a user can ride in a safe posture.

BACKGROUND ART

The saddle secured to a conventional bicycle is fixed at a certain angle, so a user on the saddle cannot change the angle if necessary and should ride with the angle of the saddle being fixed when riding on an inclination road, so the bicycle is inclined when riding on a high inclination road like a MTB, and the saddle remaining angle changes to an inclined state. In this state, the hips of the user become slid toward the rear side on the upper surface of the saddle, so the user cannot keep a proper posture. When the hips of the user slide to the front side on the upper surface of the saddle when the bike runs down on the inclined road, it is impossible to keep a proper posture, so the user cannot ride and drive the bike.

DISCLOSURE OF THE INVENTION

Accordingly, it is an object of the present invention to provide an apparatus for adjusting a saddle retaining angle of a bicycle which overcomes the problems encountered in the conventional art.

To achieve the above objects, there is provided an apparatus for adjusting a saddle retaining angle of a bicycle in which a saddle support part 2a is formed at an upper side of a saddle support tube 2 secured to a bicycle saddle 4, and an engaging piece of a center connection piece 4a protruded from a lower side of a saddle to a saddle support part is engaged to a support plate formed in the saddle support part, and a guide longitudinal hole is formed, in a horizontal direction, at the saddle support part which is connected via a rotary shaft and in which a lower side of the engaging piece 4c is placed, with a moving nut being disposed in the interior of the same, and the support protrusion shafts of both sides of the moving nut are inserted into and supported by the shaft hole of the moving shaft handle inserted into a vertical direction engaging groove of the center connection piece, and a male thread of the in-place rotation adjusting screw rod is engaged to a guide longitudinal hole of the saddle support part with the aid of a female thread hole formed at a center portion of the moving nut center part in a direction perpendicular to the support protrusion shafts of both sides of the moving nut, and the in-place rotation adjusting screw rod is rotated, and the moving nut is moved forward and backward in the guide longitudinal hole, and the lower side of the engaging piece of the center connection piece connected with the moving nut is forced to move for thereby changing a retaining angle of the saddle, so the user can retain a set angle of the saddle.

Effects

In the present invention, when a user rides a bicycle, a basic angle by which the retaining angle of the saddle is in parallel with a body upper side horizontal frame is set, and when riding on an up slope having a high inclination angle like in a mountain area, the saddle retaining angle by which the front side of the bicycle saddle is lower, and the rear side is higher, so the hips of the user on the saddle can be prevented from sliding toward the rear side on the surface of the saddle, and when riding an a down slope, the saddle angle is adjusted so that the front side of the saddle can be higher, and the rear side of the same can be lower, so it is possible for a user to ride keeping a proper posture of the user depending on the inclination of the bicycle body by changing the saddle angle to a proper saddle retaining angle matching to a user's condition.

The above operation is obtained in such a manner that the in-place rotation adjusting screw rod 6 secured to the saddle support part is rotated, and the moving nut 20 thread-engaged to the male thread part of the adjusting screw rod is forced to move toward the rear side of the saddle in the horizontal guide longitudinal hole 2c, so the moving shaft handle through which the support protrusion shaft 22 of both sides of the moving nut passes, is engaged to a vertical direction engagement groove formed at a lower side of the engaging pieces of both sides of the center connection part of the saddle, and the lower side of the center connection part is forced to move toward the moving direction of the moving nut, so that the engaging piece of the center connection part rotates about the rotary shaft 5, and the front side of the saddle is lowered, and the rear side of the same is lifted, and when the adjusting screw rod is rotated in the opposite direction, the moving nut is forced to move toward the front side of the saddle in the horizontal guide longitudinal hole, and the engaging piece of the center connection part rotates about the rotary shaft 5, and the lower side of the center engaging piece of the saddle moves toward the saddle front side of the saddle is lifted, and the rear side is lowered, and since the retaining angle adjusting angle of the saddle changes depending on the direction that the adjusting screw rod rotates, it is possible to quickly adjust the retaining angle without needing an additional tool depending on the riding condition. The above operation can be conveniently performed in a state that the rider sits on the saddle.

In addition, the adjusting screw rod is an in-place rotation screw rod formed of a support part so that it can rotate in place, not moving in an axial direction, even when the adjusting screw rod rotates. So, the moving nut does not move unless the adjusting bolt is rotated, and the lower side of the center connection part of the saddle remains stopped at a place where the moving nut is positioned. The set saddle retaining angle does not change until the next adjusting is performed.

In addition, the in-place rotation support part 6c of the in-place rotation adjusting screw rod 6 is supported in the support groove, and the moving nut 20 thread-engaged with the main thread of the adjusting screw rod is inserted into the support hole 4h formed at the center of the moving shaft handles 4e and 4f, and the moving shaft handles 4e and 4f are inserted into the vertical engaging groove 4d vertically formed at the lower side of the center connection piece 4a and the engaging piece 4c of the saddle and move along the engaging groove. The operation that the engaging piece 4c of the center connection piece 4a rotates when the moving nut is forced to move is smoothly performed. The retaining angle of the saddle can be accurately performed as the moving nut can be driven as much as the rotation of the adjusting screw rod, so it is possible to easily set a needed angle. Since the construction is simple, the manufacturing does not cost a lot, the male threads of the in-place rotation adjusting screw rod 6 is formed of a 1 to 3 thread line screw, and when selecting a screw forming the female thread screw of the moving nut 20 thread-assembled to the male screw with 1 to 3 thread lines, the moving speed of the moving nut can be made faster than the 1-thread line screw, which results in a faster adjusting speed.

Figure 1:
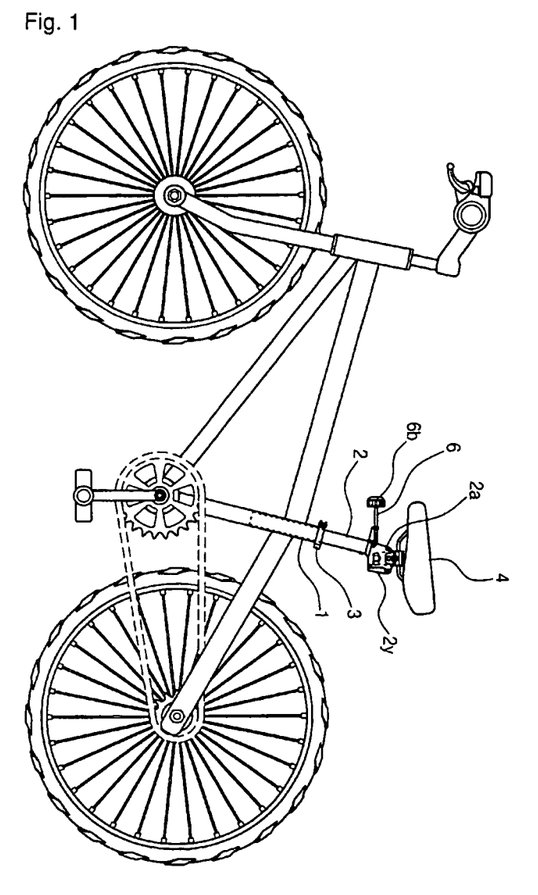
FIG. 1 is a view illustrating an example of the present invention.
Figure 2:
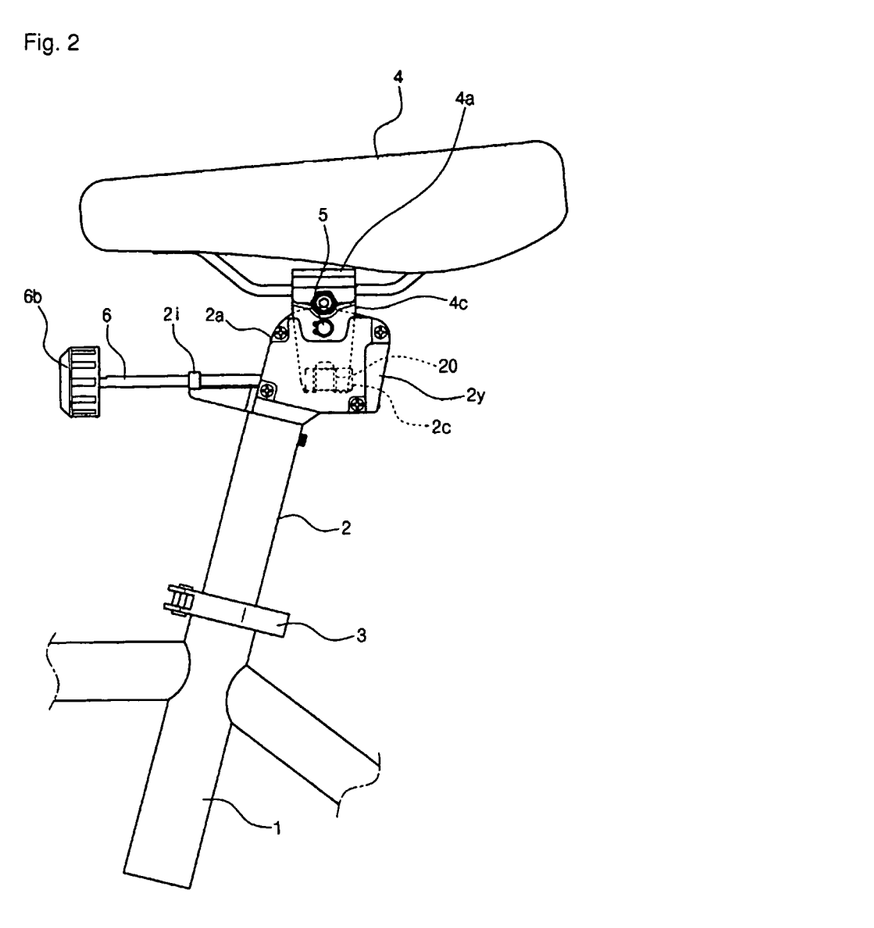
FIG. 2 is a view illustrating an outer appearance of the present invention.
Figure 3:
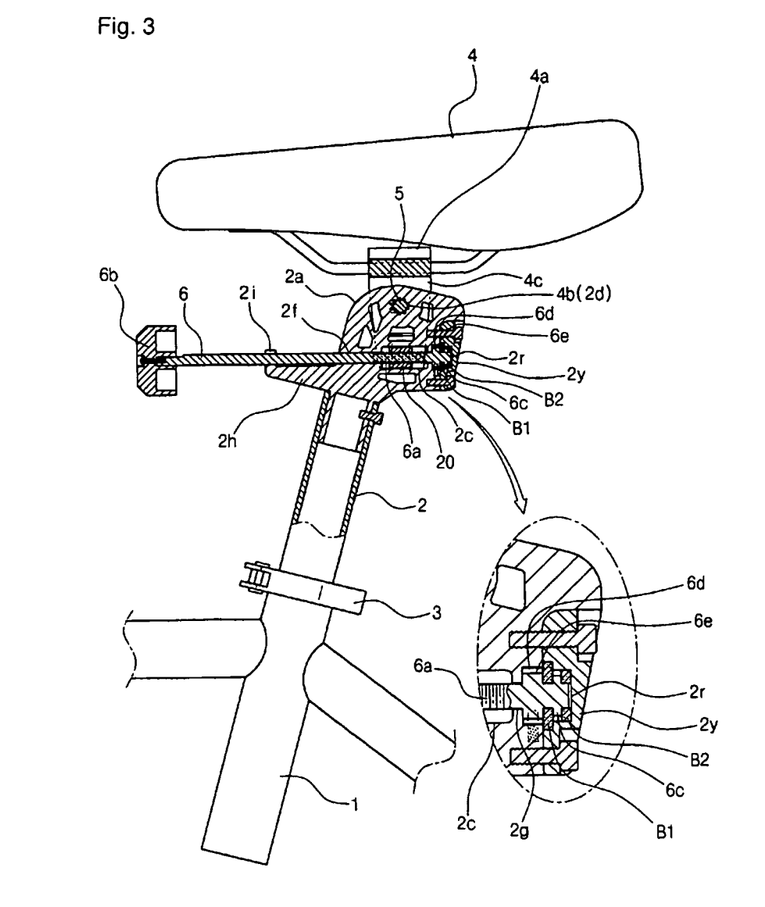
FIG. 3 is a cross sectional view of the present invention.
Figure 4:
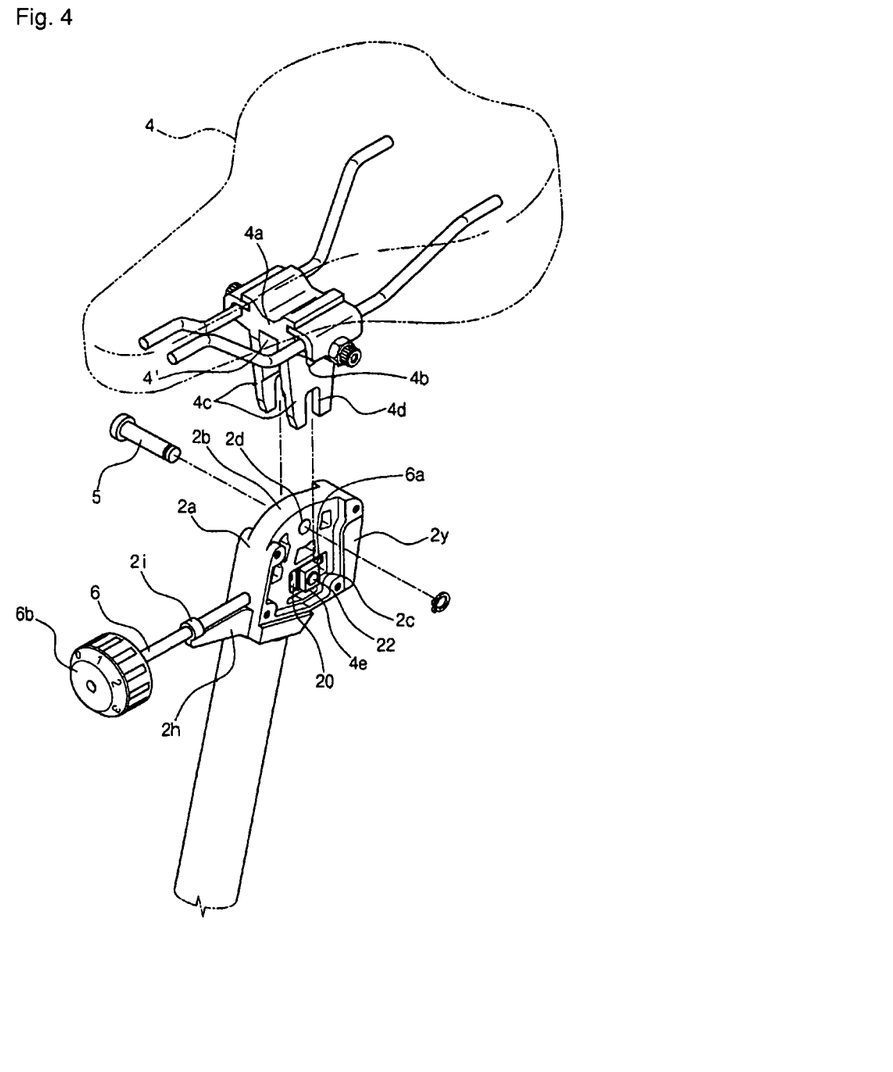
FIG. 4 is a disassembled perspective view of the present invention.
Figure 5:
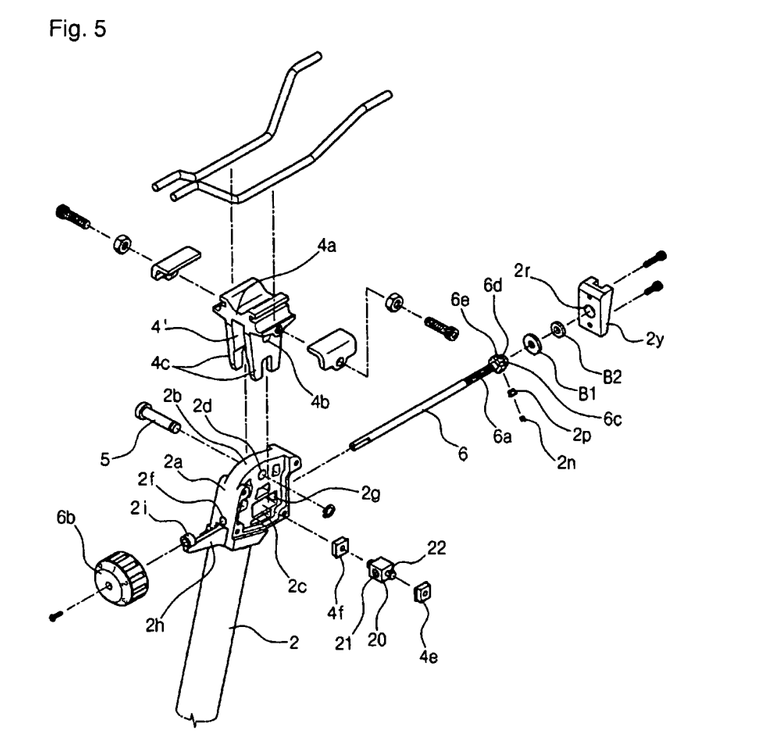
FIG. 5 is a disassembled perspective view of the present invention.
Figure 6:
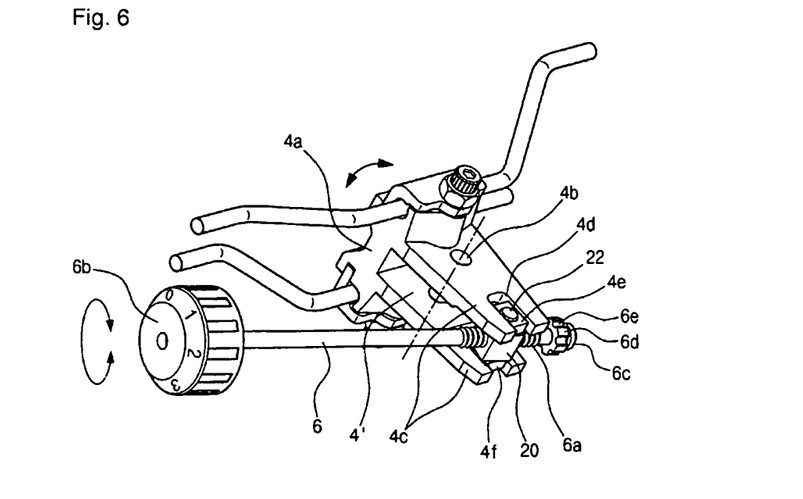
FIG. 6 is a partial perspective view of an adjusting apparatus of the present invention.
Figure 7:
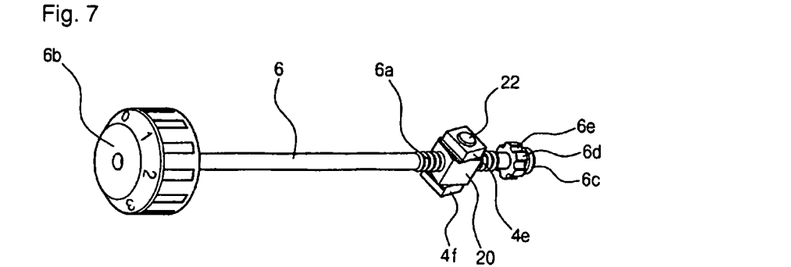
FIG. 7 is an exemplary view of a moving nut and an in-place rotation adjusting screw rod of the present invention.
Figure 8A:
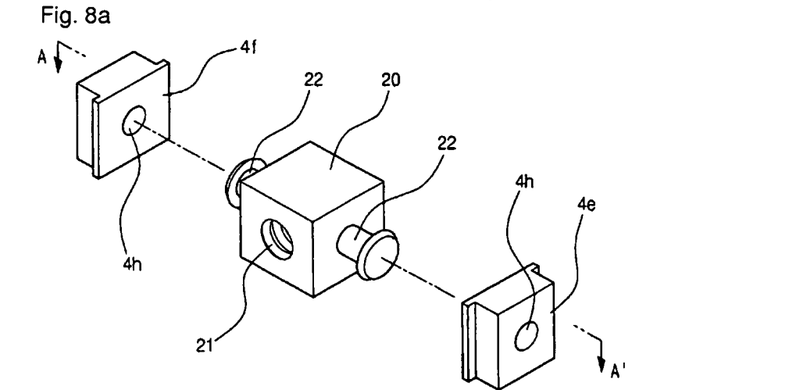
FIG. 8A is a disassembled perspective view of a moving nut and a moving shaft handle of the present invention.
Figure 8B:
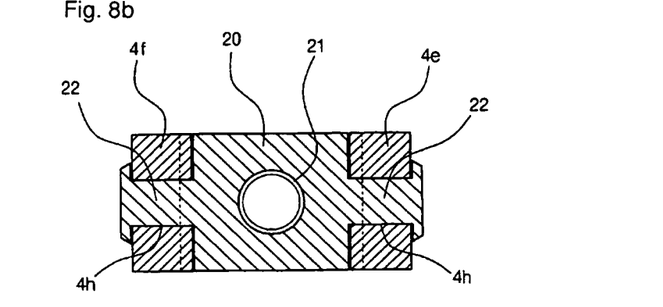
FIG. 8B is a cross sectional view of an assembled state of FIG. 8A.
Figure 9:
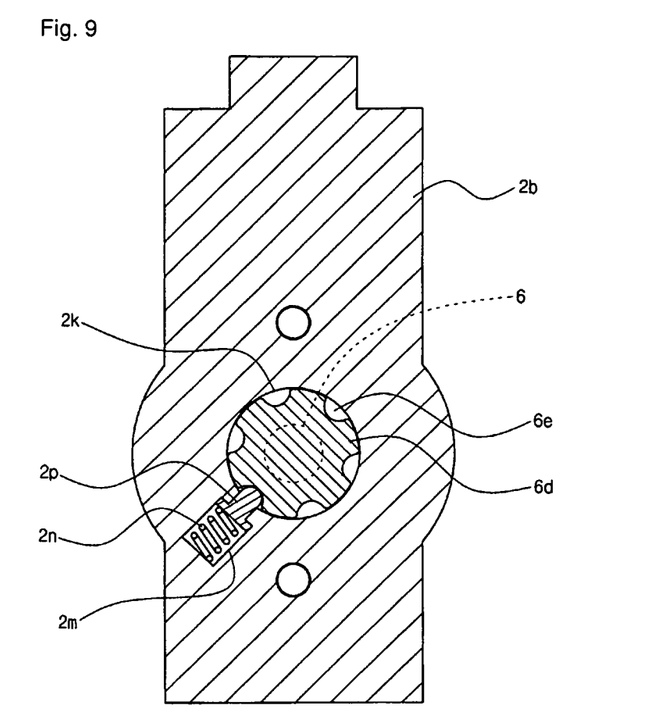
FIG. 9 is an enlarged cross sectional view of a rotation detection wheel plate of the present invention.

The in-place rotation adjusting screw rod 6 according to the present invention is equipped with a detection wheel plate 6d for detecting the rotation angle of the adjusting screw rod at the rear support part, with fixing grooves 6e being formed at regular intervals along the outer surface of the same, and an elastic member 2p loaded in the coil spring is elastically engaged in the fixing groove while contacting with the fixing groove of the detection wheel plate at an outer surface of a detection wheel plate accommodation groove 2k. When the adjusting screw rod is rotated, the operation that the elastic member is released from the fixing groove and is engaged to the fixing groove with the aid of force of the coil spring is repeatedly performed, which operation can be detected by a haptic sense for thereby easily detecting the rotation amount. Since the rotation angles are indicated by numbers on the handle, which numbers indicate the rotation, it is possible to easily control the normal or reverse rotation adjustments. After it is adjusted, the reverse rotation of the adjusting screw rod can be prevented with the aid of gravity applied to the saddle for thereby stably retaining a set retaining angle until the next adjustment, which leads to a reliable operation of the system.

Figure 10:
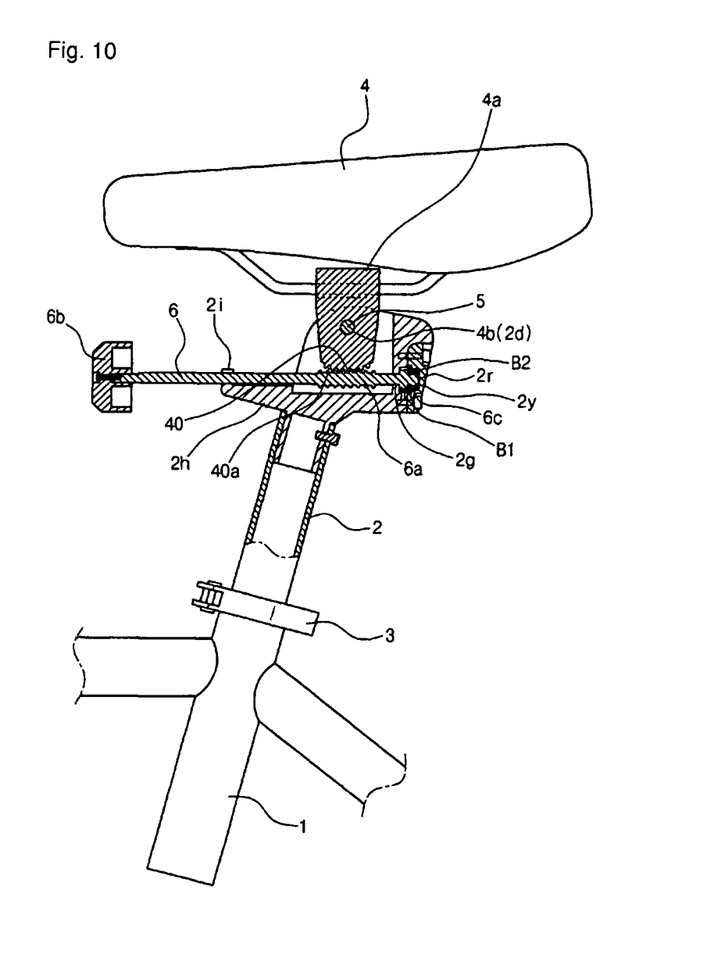
FIG. 10 is an exemplary view of another construction of the present invention.
Figure 11A:
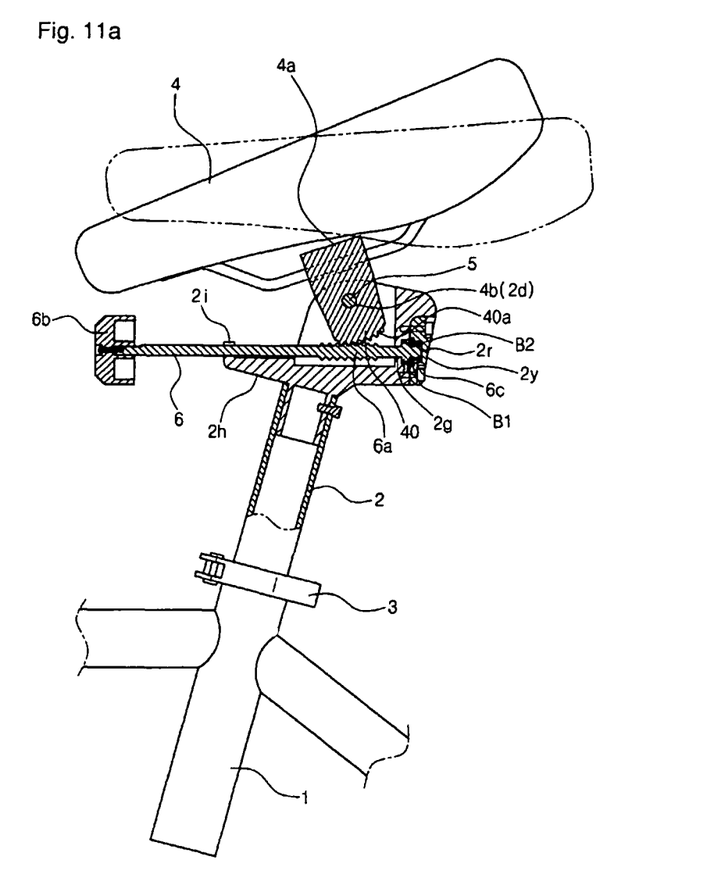
FIGS. 11A and 11B are views of the operation states of FIG. 10.
Figure 11B:
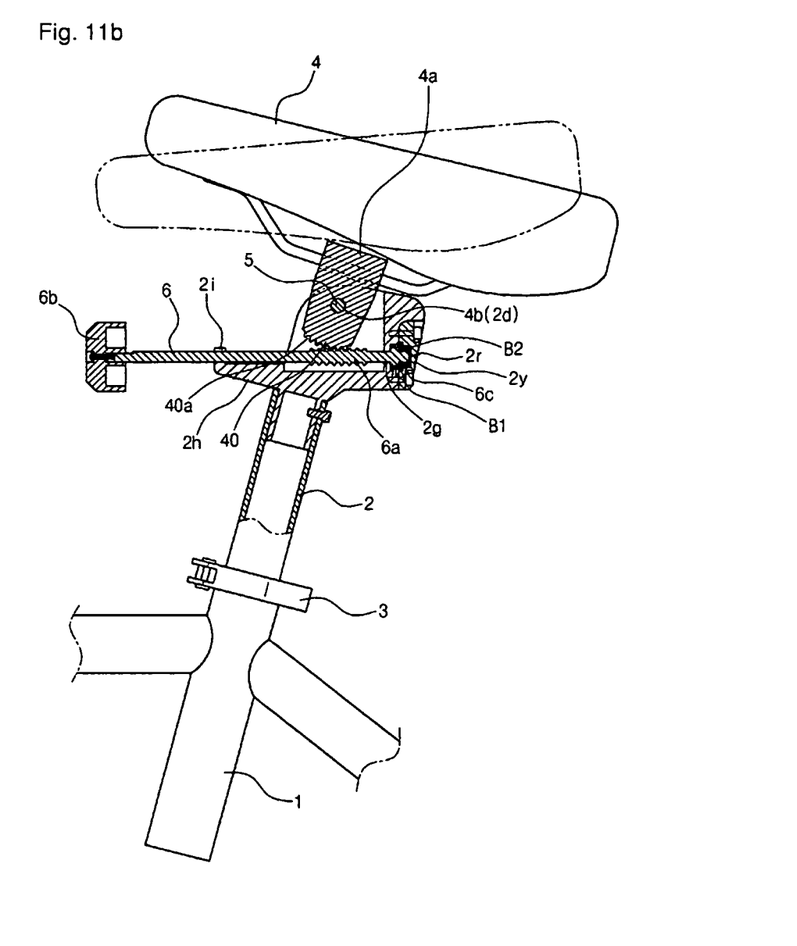
Figure 12:
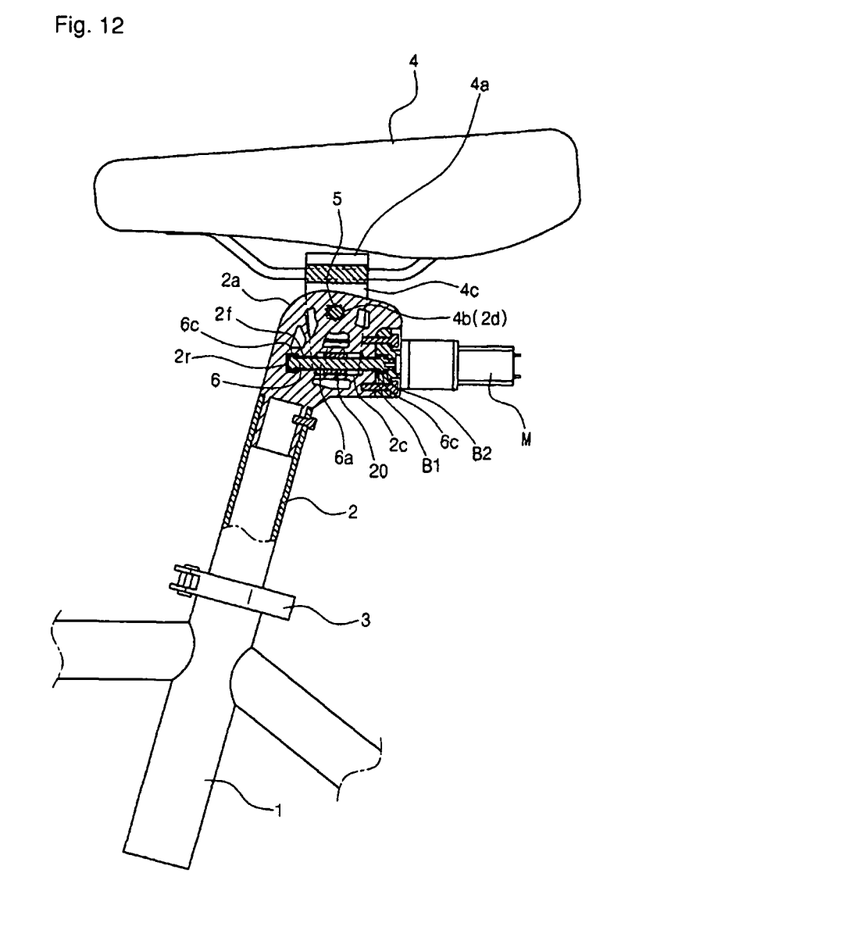
FIG. 12 is an exemplary view of a motored adjusting screw.

The center connection piece 4a of the present invention is configured in such a manner that a lower side of the engaging piece 4c is formed of a circular connection piece 40 formed about the rotary shaft 5, and a female thread 40a is formed along a circumferential surface, and the female thread groove contacts with a male thread of the in-place rotation adjusting screw rod, so that a variable operation plate can be driven via the above construction for thereby conveniently changing the saddle retaining angle. In addition, the variable apparatus can be configured with the aid of the construction that the in-place rotation adjusting screw rod is connected to the rotary shaft of the motor M which rotated in normal and reverse directions for thereby changing the saddle retaining angle by driving the variable operation plate with the driving force of the motor. The adjusting means of the saddle retaining angle can be implemented in various forms, which leads to many conveniences.

BRIEF DESCRIPTION OF THE DRAWINGS

The present invention will become better understood with reference to the accompanying drawings which are given only by way of illustration and thus are not limitative of the present invention, wherein.

MODES FOR CARRYING OUT THE INVENTION

The preferred embodiment of the present invention will be described with reference to the accompanying drawings.

In the present invention, there is provided an apparatus for adjusting a saddle retaining angle of a bicycle in which a bicycle saddle 4 is configured in such a manner that a saddle support tube 2 engaging a bicycle saddle is inserted into a saddle attaching tube 1 belonging to a bicycle body and is fixed using a tightening device 3, and a saddle support pat 2a is formed at an upper portion of the saddle support tube 2, which apparatus comprises a variable operation plate in which a bicycle saddle 4 engaged at a saddle support part is configured in such a manner that an engaging piece 4c is formed so that an interval part 4', into which a support plate 2b of a saddle support part is inserted, is formed at a central portion so that a central connection piece 4a is extended downward, and an extended part is engaged to both sides of a support plate 2b of the saddle support part 2a, and rotation shaft holes 4d and 2d are formed at the engaging piece and the support plate, respectively, and are connected via the rotary shaft 5, and a vertical direction engaging groove 4d which is in parallel with the longitudinal direction of the engaging piece at a lower end of the engaging piece, the lower end of which is open, and the shaft hole is formed at the vertical direction engaging groove, thus engaging the moving shaft handles 4e and 4f; an adjusting screw apparatus in which a guide longitudinal hole 2c is formed in a horizontal direction at a certain interval from a lower side of the rotary shaft hole 2d formed at an upper side of the support plate 2b of the saddle support part 2a, and a guide tube 2f is punched, said guide tube 2f straight passing through the central portions of the front side wall formed a front end of the saddle at an inner side of the guide longitudinal hole and the rear end side wall formed at the rear side of the saddle, and a protrusion piece 2h is formed at an outer side of the guide tube 2f of the front end side wall, and a guide tube 2i the central line of which is inconsistent with the central line of the guide tube 2f of the front side wall is further formed at the end of the protrusion piece, and a detection wheel plate accommodation groove 2k backwardly opened as the diameter is more expanded than the guide tube 2g is formed at the outer surface of the guide tube 2g of the rear end side wall, and an elastic member guide groove 2m facing the center of the detection wheel plate accommodation groove is formed at an inner surface of the same, and an elastic member 2p is provided, with a coil spring 2n being disposed in the elastic member guide groove; an in-place rotation adjusting screw rod 6 which is configured in such a manner that a handle 6*b* is inserted into a guide tube 2*i* of the protrusion piece 2*h* from the guide tube 2*g* of the rear end side wall of the guide longitudinal hole 2*c* of the adjusting screw apparatus and has a rotation angle indication surface at a front side to indicate a rotation angle, and a detection wheel 6*d* is formed at an inner side of the in-place rotation support part 6*c*, and a fixing groove 6*e* is formed on its outer surface at a regular interval and comes into contact with the elastic member 2*p*, and a male thread part 6*a* formed of 1 to 3 thread lines is formed at a portion passing through the guide longitudinal hole, so the in-place rotation adjusting screw rod 6 is engaged to the adjusting screw apparatus; a moving nut 20 configured in such a manner that a female screw hole 21 having 1~3 thread lines is formed to thread-engage with the male thread part 6*a* of the in-place rotation adjusting thread rod 6 in the guide longitudinal hole 2*c*, and a support protrusion shaft 22 is formed at both sides in the direction perpendicular to the male thread hole, and the support protrusion shaft 22 is inserted into the support hole 4*h* of the moving shaft handles 4*e* and 4*f* inserted in the vertical direction engaging groove 4*d* of the lower side of the engaging piece 4*c* of the bicycle saddle central connection piece 4*a* engaged to both outer side surfaces of the guide longitudinal hole; and an apparatus groove cover 2*y* having a shaft handle 2*r* supporting the in-place rotation support part 6*c* of the in-place rotation adjusting screw rod 6 to rotate in place by engaging to an outer side of the guide tube 2*g* of the rear end side wall of the guide longitudinal hole for thereby changing and retaining a retaining angle of the bicycle saddle 4 with the aid of the rotation of the in-place rotation adjusting screw rod.

The present invention comprises an adjusting apparatus which is configured in such a manner that the lower end of the engaging piece 4*c* of the bicycle saddle center connection piece 4*a* is formed of a circular connection piece about the rotary shaft 5, and a female thread 40*a* is formed along a circumferential surface, and the circular connection piece is driven by the rotation of the in-place rotation adjusting screw as the female thread 40*a* comes into contact with the male thread 6*a* of the in-place rotation adjusting screw rod 6, thus changing the saddle retaining angle. The changed angle can be maintained until the next adjusting.

In the present invention, a rotary shaft of a motor M rotating in left and right directions is connected with one end of the in-place rotation support part 6*c* of the in-place rotation adjusting screw rod 6, so the in-place rotation adjusting screw rod can rotate with the aid of the operation of the motor, thus changing the saddle retaining angle. The changed retaining angle can be maintained by stopping the motor until the next adjusting time.

As the present invention may be embodied in several forms without departing from the spirit or essential characteristics thereof, it should also be understood that the above-described examples are not limited by any of the details of the foregoing description, unless otherwise specified, but rather should be construed broadly within its spirit and scope as defined in the appended claims, and therefore all changes and modifications that fall within the meets and bounds of the claims, or equivalences of such meets and bounds are therefore intended to be embraced by the appended claims.

What is claimed is:

1. An assembly for angularly adjusting the saddle of a cycle to obtain a desired use position, the assembly comprising:
    an assembly support which can be attached to a frame of the cycle to support the assembly on the frame;
    a saddle support which can be attached to the saddle to support the saddle on the assembly at a use position relative to the assembly support; and
    adjustment apparatus comprising:
        a housing mounted on the assembly support;
        a set of torque delivery elements including a first element supported for rotation about a first axis within the housing and a second element: drivably connected to the first element, supported for rotation about a second axis substantially perpendicular to the first axis within the housing and attached to the saddle support to rotate the saddle support; and
        an actuator for changing angular position of the first element about the first axis to obtain a resulting angular position of the second element about the second axis which corresponds to the desired use position of the saddle wherein the assembly further comprises a retaining mechanism associated with the first element within the housing to retain the angular position of the first element and the corresponding desired use position of the saddle and wherein the retaining mechanism includes a spring-biased locking member supported for linear movement towards the first axis within the housing and an annular part mounted to rotate with the first element within the housing, the annular part having a plurality of outer circumferentially spaced depressions formed thereon to receive and retain the locking member therein, the location of the depressions about the circumference of the annular part corresponding to predetermined angular positions of the first element.

2. The assembly as claimed in claim 1 further comprising a coupler assembly for drivably connecting the first element to the second element within the housing.

3. The assembly as claimed in claim 1 wherein the actuator is a manual actuator.

4. The assembly as claimed in claim 2 wherein the first element includes a lead screw and the coupler assembly includes a nut through which the lead screw extends.

5. The assembly as claimed in claim 1 wherein the assembly support includes a saddle support tube.

6. The assembly as claimed in claim 1 wherein the saddle support includes a center connection piece.

7. The assembly as claimed in claim 2 wherein the second element includes a pair of spaced, downwardly extending, engaging portions and wherein the coupler assembly includes a nut and a pair of spaced parts, each part being coupled to its respective engaging portion to drivably connect the first element to the second element.

8. The assembly as claimed in claim 1 wherein the first and second elements are drivably connected by threads formed on the first and second elements.

9. An assembly for angularly adjusting the saddle of a bicycle to obtain a desired use position, the assembly comprising:
    an assembly support which can be attached to a frame of the bicycle to support the assembly on the frame;
    a saddle support which can be attached to the saddle to support the saddle on the assembly at a use position relative to the assembly support; and
    adjustment apparatus comprising:
        a housing mounted on the assembly support;
        a set of torque delivery elements including a first element supported for rotation about a first axis within the housing and a second element: drivably connected to the first element, supported for rotation about a second axis substantially perpendicular to the first axis within the housing and attached to the saddle support to rotate the saddle support; and an actuator for changing angular position of the first element about the first axis to obtain a resulting angular position of the second element about the second axis which corresponds to the desired use position of the saddle wherein the assembly further comprises a retaining mechanism associated with the first element within the housing to retain the angular position of the first element and the corresponding desired use position of the saddle and wherein the retaining mechanism includes a spring-biased locking member supported for linear movement towards the first axis within the housing and an annular part mounted to rotate with the first element within the housing, the annular part having a plurality of outer circumferentially spaced depressions formed thereon to receive and retain the locking member therein, the location of the depressions about the circumference of the annular part corresponding to predetermined angular positions of the first element.

10. The assembly as claimed in claim 9 further comprising a coupler assembly for drivably connecting the first element to the second element within the housing.

11. The assembly as claimed in claim 10 wherein the second element includes a pair of spaced, downwardly extending, engaging portions and wherein the coupler assembly includes a nut and a pair of spaced parts, each part being coupled to its respective engaging portion to drivably connect the first element to the second element.

* * * * *